United States Patent
Lee et al.

(10) Patent No.: US 10,280,239 B2
(45) Date of Patent: May 7, 2019

(54) METHOD FOR PREPARING POLYOLEFIN POLYMER FOR FIBER PRODUCTION

(71) Applicant: LG CHEM, LTD., Seoul (KR)

(72) Inventors: Seung Mi Lee, Daejeon (KR); Yi Young Choi, Daejeon (KR); Dae Sik Hong, Daejeon (KR); Eun Kyoung Song, Daejeon (KR); Heon Yong Kwon, Daejeon (KR); Young Suk You, Daejeon (KR); Ki Soo Lee, Daejeon (KR); Ki Heon Song, Daejeon (KR)

(73) Assignee: LG CHEM, LTD., Seoul (KR)

( * ) Notice: Subject to any disclaimer, the term of this patent is extended or adjusted under 35 U.S.C. 154(b) by 2 days.

(21) Appl. No.: 15/511,944

(22) PCT Filed: Sep. 30, 2015

(86) PCT No.: PCT/KR2015/010296
§ 371 (c)(1),
(2) Date: Mar. 16, 2017

(87) PCT Pub. No.: WO2016/052982
PCT Pub. Date: Apr. 7, 2016

(65) Prior Publication Data
US 2017/0291969 A1  Oct. 12, 2017

(30) Foreign Application Priority Data

Sep. 30, 2014 (KR) .................. 10-2014-0131858
Sep. 25, 2015 (KR) .................. 10-2015-0136920

(51) Int. Cl.
| | | |
|---|---|---|
| C08F 4/653 | (2006.01) | |
| C08F 4/6592 | (2006.01) | |
| C08F 210/16 | (2006.01) | |
| C08L 23/08 | (2006.01) | |
| C08F 110/02 | (2006.01) | |
| D01F 6/04 | (2006.01) | |
| C08F 4/659 | (2006.01) | |

(52) U.S. Cl.
CPC .............. *C08F 110/02* (2013.01); *D01F 6/04* (2013.01); *C08F 4/65908* (2013.01); *C08F 4/65912* (2013.01); *C08F 4/65916* (2013.01); *C08F 4/65925* (2013.01); *C08F 4/65927* (2013.01); *C08F 210/16* (2013.01); *C08F 2410/01* (2013.01); *C08F 2420/01* (2013.01)

(58) Field of Classification Search
CPC .............. C08F 4/65904; C08F 4/65927; C08F 4/65923; C08F 210/16; C08L 23/8015
See application file for complete search history.

(56) References Cited

U.S. PATENT DOCUMENTS

| | | | |
|---|---|---|---|
| 5,786,291 A | 7/1998 | Speca et al. | |
| 6,039,767 A | 3/2000 | Boyes et al. | |
| 6,476,172 B1 | 11/2002 | Wachowicz et al. | |
| 9,732,171 B2 * | 8/2017 | Sung | C08F 4/6592 |
| 9,975,969 B2 * | 5/2018 | Cho | C08F 10/02 |
| 9,988,469 B2 * | 6/2018 | Song | C08F 4/64 |
| 2011/0105705 A1 | 5/2011 | Han et al. | |
| 2012/0329966 A1 | 12/2012 | Kwon et al. | |
| 2013/0046068 A1 | 2/2013 | Kwon et al. | |
| 2014/0206828 A1 | 7/2014 | Kwon et al. | |

FOREIGN PATENT DOCUMENTS

| | | |
|---|---|---|
| CN | 102227449 A | 10/2011 |
| CN | 102574885 A | 7/2012 |
| CN | 104017117 A | 9/2014 |
| EP | 2374822 A2 | 10/2011 |
| EP | 2428525 A2 | 3/2012 |
| EP | 2484443 A2 | 8/2012 |
| JP | 2001 500574 A | 1/2001 |
| JP | 2001-526742 A | 12/2001 |
| JP | 2002-523568 A | 7/2002 |
| JP | 2003-119614 A | 4/2003 |
| JP | 2012-526175 A | 10/2012 |
| JP | 2013-521398 A | 6/2013 |
| KR | 10-1025038 B1 | 3/2011 |
| KR | 10-2011-0035968 A | 4/2011 |
| KR | 10-2011-0101385 A | 9/2011 |
| KR | 10-2011-0101386 A | 9/2011 |
| KR | 10-2011-0117736 A | 10/2011 |
| KR | 10-2012-0076156 A | 7/2012 |
| KR | 10-2012-0087706 A | 8/2012 |
| KR | 10-2013-0027319 A | 3/2013 |
| KR | 10-1271055 B1 | 6/2013 |
| WO | 00-012565 A1 | 3/2000 |
| WO | 2006/080817 A1 | 8/2006 |

\* cited by examiner

*Primary Examiner* — Caixia Lu
(74) *Attorney, Agent, or Firm* — Dentons US LLP

(57) ABSTRACT

The present invention relates to a polyolefin which exhibits a narrow molecular weight distribution, high strength, and a high stretching ratio, and a preparation method therefor. According to the present invention, it is possible to provide polyethylene with high catalyst activity, high molecular weight, and controlled molecular weight distribution by using, in polymerization of an olefin monomer, a hybrid supported metallocene catalyst in which a borate compound is used as a second cocatalyst. In addition, if the polyolefin is processed, it is possible to produce a fiber with excellent mechanical properties and an excellent stretching ratio.

12 Claims, No Drawings

METHOD FOR PREPARING POLYOLEFIN POLYMER FOR FIBER PRODUCTION

CROSS-REFERENCE TO RELATED APPLICATIONS

The present application is a National Stage Application No. PCT/KR2015/010296, filed Sep. 30, 2015, and claims the benefit of priority based on Korean Patent Application No. 10-2014-0131858 dated Sep. 30, 2014 and Korean Patent Application No. 10-2015-0136920 dated Sep. 25, 2015, all of which are hereby incorporated by reference in their entirety for all purposes as if fully set forth herein.

TECHNICAL FIELD

The present invention relates to a method for preparing a polyolefin polymer for fiber production which exhibits a medium molecular weight range and a narrow molecular weight distribution and thus has high tenacity and a high stretching ratio.

BACKGROUND OF ART

High density polyethylene is used to produce high tenacity fibers such as for ropes, fishing nets, and the like. Such high density polyethylene is required to have properties such as high stretchability and high tenacity.

In the above-mentioned fiber products, it is known that a narrower molecular weight distribution of the high density polyethylene leads to better mechanical properties. That is, when the molecular weight distribution of the high density polyethylene is narrow, the stretching ratio becomes high, and high tenacity can be obtained by high stretchability. However, if the molecular weight distribution of the high density polyethylene is too narrow, there is a problem that processability thereof becomes very inferior.

On the other hand, in the method for producing polyethylene using a Ziegler-Natta catalyst that is commercially widely used in the art, it is difficult to obtain a polymer having a uniform molecular weight, and the molecular weight distribution thereof is wide.

Although polyethylene having a wide molecular weight distribution has an advantage of good processability, there is a disadvantage that its mechanical properties are lowered, a low molecular weight portion is eluted during processing, and inherent physical properties of the resin are deteriorated.

In order to solve these problems, a method for preparing a polyethylene having a narrow molecular weight distribution using a metallocene catalyst system is proposed. However, in order to apply it to a conventional commercial process such as a slurry process and a gas-phase process, the metallocene must be supported on an appropriate support. In the case of the supported metallocene catalysts used so far, there was a disadvantage that the molecular weight distribution becomes broad and the catalytic activity is lowered.

Moreover, the conventional method has a limitation in the amount of aluminoxane which is a cocatalyst for increasing the catalytic activity, and has a disadvantage that the catalyst cost is greatly increased due to an expensive cocatalyst. In addition, in the case of metallocene catalysts, the hydrogen reactivity is high and the beta-hydrogen elimination reaction predominates, and thus there is a limit to increase the molecular weight. Therefore, when the conventional method is applied, there was a problem that it is difficult to apply it to a high-rigidity resin having a high molecular weight and a narrow molecular weight distribution, that is, a resin for a fiber.

DETAILED DESCRIPTION OF THE INVENTION

Technical Problem

It is an object of the present invention to provide a method for preparing a polyolefin polymer for fiber production which exhibits a narrow molecular weight distribution and a medium molecular weight range by polymerizing olefin monomers using a specific hybrid supported metallocene catalyst.

It is another object of the present invention to provide a method for preparing a polyolefin polymer for fiber production which exhibits excellent tenacity and stretching ratio.

Technical Solution

In order to achieve the above object, the present invention provides a method for preparing a polyolefin polymer for fiber production including polymerizing one or more olefin monomers in the presence of a hybrid supported metallocene catalyst, wherein the hybrid supported metallocene catalyst includes a first cocatalyst supported on a support, first and second metallocene compounds represented by the following Chemical Formulas 1 and 2, and a second cocatalyst, and is prepared by a method including:

supporting a first metallocene compound of the following Chemical Formula 1 and a second metallocene compound of the following Chemical Formula 2, respectively, before and after a step of supporting the first cocatalyst on the support; and supporting a borate-based second catalyst on the support.

$$(R^a)_p(R^b)M'Q_{3-p} \qquad \text{[Chemical Formula 1]}$$

In Chemical Formula 1 above,

P is an integer of 0 or 1,

M' is a Group 4 transition metal, $R^a$ and $R^b$ may be the same as or different from each other and are each independently a cyclopentadienyl ligand substituted with one or more selected from the group consisting of hydrogen, an alkyl having 1 to 20 carbon atoms, an alkoxyalkyl having 2 to 20 carbon atoms, a cycloalkyl having 3 to 20 carbon atoms, an aryl having 6 to 40 carbon atoms, an alkenyl having 2 to 20 carbon atoms, an alkylaryl having 7 to 40 carbon atoms, an arylalkyl having 7 to 40 carbon atoms, and an arylalkenyl having 8 to 40 carbon atoms, and Q is a halogen.

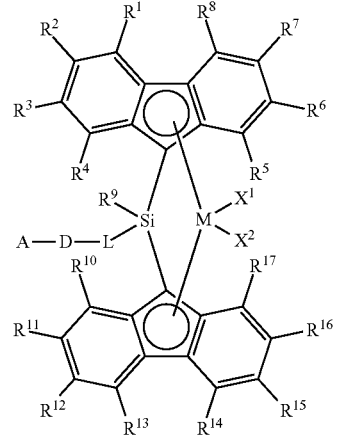

[Chemical Formula 2]

In Chemical Formula 2 above, $R^1$ to $R^{17}$ are the same as or different from each other and are each independently hydrogen, a halogen, an alkyl group having 1 to 20 carbon atoms, an alkenyl group having 2 to 20 carbon atoms, a cycloalkyl group having 2 to 20 carbon atoms, an aryl group having 6 to 20 carbon atoms, an alkylaryl group having 7 to 20 carbon atoms, or an arylalkyl group having 7 to 20 carbon atoms; or $R^1$ to $R^{17}$ are bonded to each other to form a cycloalkyl group having 2 to 20 carbon atoms, an aryl group having 6 to 20 carbon atoms, an alkylaryl group having 7 to 20 carbon atoms, or an arylalkyl group having 7 to 20 carbon atoms; at least one of $R^1$ to $R^{17}$ is a substituent other than hydrogen and a halogen among the above substituents, L is a linear or branched alkylene group having 1 to 10 carbon atoms, D is —O—, —S—, —N($R^{18}$)—, or —Si($R^{19}$)($R^{20}$)—, wherein $R^{18}$ to $R^{20}$ are the same as or different from each other and are each independently hydrogen, a halogen, an alkyl group having 1 to 20 carbon atoms, an alkenyl group having 2 to 20 carbon atoms, or an aryl group having 6 to 20 carbon atoms, A is hydrogen, a halogen, an alkyl group having 1 to 20 carbon atoms, an alkenyl group having 2 to 20 carbon atoms, an aryl group having 6 to 20 carbon atoms, an alkylaryl group having 7 to 20 carbon atoms, an arylalkyl group having 7 to 20 carbon atoms, an alkoxy group having 1 to 20 carbon atoms, an alkoxyalkyl group having 2 to 20 carbon atoms, a heterocycloalkyl group having 2 to 20 carbon atoms, or a heteroaryl group having 5 to 20 carbon atoms, M is a Group 4 transition metal, and $X^1$ and $X^2$ are the same as or different from each other and are each independently a halogen, an alkyl group having 1 to 20 carbon atoms, an alkenyl group having 2 to 20 carbon atoms, an aryl group having 6 to 20 carbon atoms, a nitro group, an amido group, an alkylsilyl group having 1 to 20 carbon atoms, an alkoxy group having 1 to 20 carbon atoms, or a sulfonate group having 1 to 20 carbon atoms.

In the hybrid supported metallocene catalyst, the second cocatalyst is a borate-based cocatalyst, and the ratio between the total metal moles included in the metallocene catalyst in which the first metallocene compound and the second metallocene compound are combined and the moles of boron contained in the second cocatalyst may be from 1:0.45 to 1:3.

Also, in the hybrid supported metallocene catalyst, the first cocatalyst may be an aluminoxane-based cocatalyst, or a trisubstituted aluminum or boron-containing cocatalyst, and it may be one or more selected from the group consisting of compounds represented by the following Chemical Formulas 3 and 4.

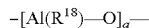   [Chemical Formula 3]

   [Chemical Formula 4]

In Chemical Formulas 3 and 4 above, each $R^{18}$ may be the same as or different from each other, and each is independently a halogen or a hydrocarbyl having 1 to 20 carbon atoms substituted or unsubstituted with a halogen, a is an integer of 2 or more, each $R^{19}$ may be the same as or different from each other, and each is independently a halogen, a hydrocarbon having 1 to 20 carbon atoms, or a hydrocarbon having 1 to 20 carbon atoms substituted with a halogen, and $D^1$ is aluminum or boron.

Further, the second cocatalyst may be a borate compound represented by the following Chemical Formula 5 or 6.

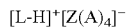   [Chemical Formula 5]

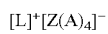   [Chemical Formula 6]

In Chemical Formulas 5 and 6 above, each L is independently a neutral or cationic Lewis acid, each H is independently a hydrogen atom, each Z is independently a boron atom, and each A is independently an aryl or an alkyl group having 6 to 20 carbon atoms in which at least one hydrogen atom is substituted with a halogen, a hydrocarbyl group having 1 to 20 carbon atoms, an alkoxy group, a phenoxy group, a nitrogen atom, a phosphorus atom, a sulfur atom, or an oxygen atom.

The second cocatalyst may preferably include trityl tetrakis(pentafluorophenyl)borate, N,N-dimethylanilinium tetrakis(pentafluorophenyl)borate, trimethylammonium tetrakis(pentafluorophenyl)borate, triethylammonium tetrakis(pentafluorophenyl)borate, or tripropylammonium tetrakis(pentafluorophenyl)borate.

In addition, the support may contain a hydroxyl group and a siloxane group on its surface. The support preferably contains one or more selected from silica, silica-alumina, and silica-magnesia.

The olefin monomer may be one or more selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, and 1-itocene.

Also, a polyolefin polymer for fiber production having a weight average molecular weight of 100,000 to 300,000 and a PDI of 2.0 to 3.2 can be prepared according to the above method.

Further, a polyolefin polymer having tenacity of 9.0 to 15.0 (gf/denier) as measured according to ASTM D638 and a stretching ratio of 7 to 15 times can be produced by the above method.

In addition, a polyolefin polymer having a melt index (MI; 190° C., 2.16 kg) of 0.1 to 2.0 g/10 min and a density of 0.945 to 0.955 g/cm³ can be produced by the above method. Preferably, the polyolefin polymer may have a melt index of 0.3 to 1.5 g/10 min and a density of 0.945 to 0.955 g/cm³.

Further, the present invention provides a fiber including a polyolefin polymer.

The fiber may have tenacity of 9.0 to 15.0 (gf/denier) as measured according to ASTM D 638 and a stretching ratio of 7 to 15 times. In addition, the fiber may have a tensile strength half-life of 230 to 320 h when measuring a phenomenon where tensile strength decreases under the condition accelerated with a xenon-arc lamp according to AATCC Test Method #16.

Advantageous Effects

According to the present invention, it is possible to produce a polyolefin polymer exhibiting a medium molecular weight range and a narrow molecular weight distribution, by using, in (co)polymerization of olefins, a hybrid supported metallocene catalyst in which different metallocene compounds and first and second cocatalysts are supported.

In one example, the present invention controls the activity of a metallocene compound by using a borate-based compound in which the amount of the second cocatalyst in the hybrid supported metallocene catalyst is limited to a certain range, thereby narrowing the molecular weight distribution of the polyolefin. Therefore, in the present invention, by using the polyolefin polymer, it is possible to produce a fiber having excellent mechanical properties, particularly excellent tenacity and an excellent stretching ratio, as compared with the prior art.

DETAILED DESCRIPTION OF THE EMBODIMENTS

The terminology used herein is only for the purpose of describing particular embodiments and is not intended to limit the scope of the invention. A singular expression is intended to also include the plural, unless the context clearly indicates otherwise. It should be understood that the term "comprising", "including", or "having" as used herein defines the presence of stated features, integers, steps, components, or their combinations, but does not exclude the presence or addition of one or more other features, integers, steps, components, or their combinations.

While the embodiments of the present invention can be variously modified and have alternative forms, specific embodiments thereof are shown by way of examples and will be described in detail. It should be understood, however, that there is no intent to limit the invention to the particular forms disclosed, and the invention is to cover all modifications, equivalents, and alternatives falling within the spirit and scope of the invention.

Hereinafter, the present invention will be described in detail.

According to a preferred embodiment of the present invention, a method for preparing a polyolefin-based homopolymer for fiber production including (co)polymerizing one or more olefin monomers in the presence of a hybrid supported metallocene catalyst is provided, wherein the hybrid supported metallocene catalyst includes a first cocatalyst supported on a support, first and second metallocene compounds represented by Chemical Formulas 1 and 2, and a second cocatalyst, and is produced by a method including: supporting a first metallocene compound of Chemical Formula 1 and a second metallocene compound of Chemical Formula 2, respectively, before and after a step of supporting the first cocatalyst on the support; and supporting a borate-based second catalyst on the support.

The present invention is characterized in that a multicomponent supported metallocene catalyst capable of producing a polyolefin polymer having high catalytic activity and controlled molecular weight and molecular weight distribution is prepared, and the prepared metallocene catalyst is used in a method for preparing a polyolefin polymer for fiber production.

According to this method, the present invention can provide a polyolefin polymer having a medium molecular weight range and a narrow molecular weight distribution (PDI; Mw/Mn).

Preferably, the polyolefin polymer prepared by the process of the present invention may have a weight average molecular weight of 100,000 or more, 150,000 or more, or 170,000 or more, and 300,000 or less, or 200,000 or less, and it may have a PDI of 2.0 or more, 2.2 or more, or 2.5 or more, and 3.2 or less, or 3.0 or less.

In the present invention, the polyolefin polymer is characterized in that it is used in the preparation of fibers having tenacity of 9.0 to 15.0 (gf/denier) as measured according to ASTM D638 and a stretching ratio of 7 to 15 times, or 10 to 15 times.

The polyolefin polymer may have a melt index (MI; 190° C., 2.16 kg) of 0.1 to 2.0 g/10 min and a density of 0.945 to 0.955 g/cm$^3$. Preferably, the polyolefin polymer has a melt index of 0.3 to 1.5 g/10 min and a density of 0.945 to 0.955 g/cm$^3$. Further, the polyolefin polymer is preferably a homopolymer.

Such a polyolefin polymer can be effectively used in the preparation of fibers having excellent catalytic activity and exhibiting excellent high tenacity and high stretching ratio.

Here, the density, melt index, and molecular weight distribution properties in the polyolefin polymer according to the present invention are related to the stretching ratio, tenacity, and processability properties which are exhibited in the preparation of a fiber product of a high tenacity fiber using the above polyolefin polymer.

The narrower the molecular weight distribution of the polyolefin homopolymer, the better the stretching ratio. In addition, the larger the stretching ratio, the better the tenacity. The density is high at the same stretching ratio, and as the molecular weight increases, it is better.

In other words, it can be seen that, in order to achieve a high stretching ratio, the molecular weight distribution must be narrow. However, if the molecular weight distribution is too narrow, the processability may become inferior. Thus, when the molecular weight distribution is from 2 to 3.2 as described above, it is possible to achieve high stretching and proper processability as more optimized properties. In addition, as the molecular weight increases, that is, the melt index decreases, the tenacity becomes excellent. However, when the molecular weight is too large, there is a problem that the extrusion processability and productivity are very poor due to the heavy load of processing equipment. Therefore, when the melt index is 0.1 to 2.0 g/10 min, more preferably 0.3 to 1.5 g/10 min as described above, excellent processability properties can be exhibited.

In addition, at the same stretching ratio, the greater the density, the better the tenacity. Therefore, the polyolefin polymer according to the present invention is more preferably a homopolymer that does not use a comonomer. Further, the homopolymer has a narrow molecular weight distribution, and exhibits a characteristic that, as the melt index decreases, the density is lowered. Therefore, as described above, when the homopolymer has a density of 0.945 to 0.955 g/cm$^3$, a melt index (MI; 190° C., 2.16 kg) of 0.3 to 1.5 g/10 min, and a molecular weight distribution (PDI; Mw/Mn) of 2.0 to 3.2, it can exhibit high stretching and high tenacity properties optimized for fibers.

The olefin polymer according to the present invention is preferably an ethylene homopolymer, but it may be a copolymer containing an ethylene and an alpha olefin-based comonomer, if necessary. Examples of the alpha olefin include 1-butene, 1-pentene, 1-hexene, 4-methyl-1-pentene, 1-octene, 1-decene, 1-dodecene, 1-tetradecene, 1-hexadecene, 1-octadecene, 1-eicosene, and the like, but are not limited thereto. Of these, alpha olefins having 4 to 10 carbon atoms are preferred, and one or more kinds of alpha olefins may be used together as comonomers. The content of alpha olefin-based comonomer in the copolymer is preferably 0.1 to 45% by weight, more preferably 0.1 to 20% by weight, and most preferably 0.1 to 4% by weight.

The polyolefin polymer according to the present invention is excellent in processability and has a value of melt flow rate ratio (MFRR) within a range suitable for processing, and it is excellent in high stretching and high strength properties, and thus can be used to produce high tenacity fibers.

On the other hand, in the present invention, the polyolefin polymer exhibiting the above physical properties can be produced using a specific supported metallocene catalyst.

The method for producing a multicomponent supported metallocene catalyst includes a step of supporting two or more kinds of metallocene compounds having ligands substituted with an alkoxide or the like, respectively, before and after a step of supporting a first cocatalyst (for example, an organometallic compound containing aluminum) on the above support. In one example, the order of such supporting may include sequentially supporting a first metallocene compound, a first cocatalyst, and a second metallocene compound on a support. In another example, the order of the supporting may include sequentially supporting a second metallocene compound, a first cocatalyst and a first metallocene compound on the support.

At this time, the basic catalyst structure includes one kind of low-molecular weight/high-activity catalyst and one kind of polymer catalyst. The characteristics of such catalyst structure are that the activity and molecular weight can be adjusted according to the proportion of each catalyst, but in order to obtain high molecular weight polyethylene, there is a disadvantage that the catalytic activity is lowered and the molecular weight distribution becomes wide. In the case of supporting one kind of catalyst, it has been pointed out that the molecular weight distribution is narrow, but the molecular weight is lowered or the catalytic activity is remarkably low.

In order to solve these problems, the present invention produces a supported catalyst by adding a borate-based compound as a second cocatalyst component. By adjusting the amount of the second cocatalyst component within a specific range, it is possible to produce a polyolefin polymer having a narrow molecular weight distribution while maintaining the characteristics of the multicomponent metallocene catalyst. The order of supporting the second cocatalyst is not particularly limited, and for example, the supporting can be performed at any stage during the sequential supporting of the first cocatalyst and the first and second metallocene compounds, but suitably, the supporting can be performed after the first catalyst and the first and second metallocene compounds are all supported on the support.

More specifically, the present invention provides a method which includes adding a borate-based compound as a catalyst component to prepare a hybrid supported metallocene catalyst and then utilizing it for (co)polymerization of an olefin monomer, thereby controlling the molecular weight distribution of the resulting polyolefin (preferably polyethylene) and increasing the catalytic activity.

The polyolefin produced by using these techniques is excellent in mechanical properties and is suitable for a resin for fibers having an excellent stretching ratio.

Now, the method for producing the hybrid supported metallocene catalyst used for the polymerization of olefins according to the present invention will be described in more detail.

First, in the present invention, the hybrid supported metallocene catalyst may as also be called the multicomponent supported metallocene catalyst.

In the hybrid supported metallocene catalyst of the present invention, the ratio between the total metal moles contained in the metallocene catalyst in which the first metallocene compound and the second metallocene compound are combined and the moles of boron contained in the borate-based second catalyst may be 1:0.45 or more, 1:0.8 or more, or 1:1 or more, and may be 1:3 or less, 1:2.8 or less, or 1:2 or less. If the molar ratio is leas than 1:0.45, there is a problem that the catalytic activity is lowered. If the molar ratio is more than 1:3, the activity is excellent, but there is a disadvantage that the polymerization reactivity is not uniform and the operation of the process is not easy.

In the first metallocene compound, M' is selected from the group consisting of titanium, zirconium, and hafnium, and Q may be selected from the group consisting of F, Cl, Br, and I.

For example, the first metallocene compound may be a compound represented by the following Chemical Formulae 1a or 1b, but is not limited thereto.

[Chemical Formula 1a]

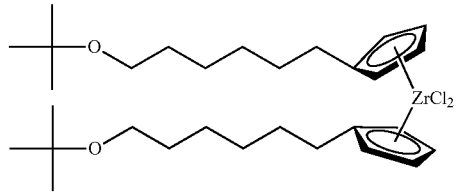

[Chemical Formula 1b]

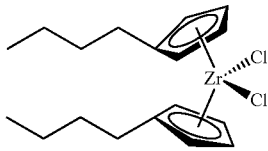

In the metallocene compound according to the present invention, specific examples of the substituents of Chemical Formula 2 are as follows.

The $C_1$ to $C_{20}$ alkyl group includes a linear or branched alkyl group, and specific examples thereof include a methyl group, an ethyl group, a propyl group, an isopropyl group, an n-butyl group, a tert-butyl group, a pentyl group, a hexyl group, a heptyl group, an octyl group, and the like.

The $C_2$ to $C_{20}$ alkenyl group includes a linear or branched alkenyl group, and specific examples thereof include an allyl group, an ethenyl group, a propenyl group, a butenyl group, a pentenyl group, and the like.

The $C_6$ to $C_{20}$ aryl group includes a monocyclic or fused ring-type aryl group, and specific examples thereof include a phenyl group, a biphenyl group, a naphthyl group, a phenanthrenyl group, a fluorenyl group, and the like.

The $C_5$ to $C_{20}$ heteroaryl group includes a monocyclic or fused ring-type heteroaryl group, and specific examples thereof include a carbazolyl group, a pyridyl group, a quinoline group, an isoquinoline group, a thiophenyl group, a furanyl group, an imidazole group, an oxazolyl group, a thiazolyl group, a triazine group, a tetrahydropyranyl group, a tetrahydrofuranyl group, and the like.

The $C_1$ to $C_{20}$ alkoxy include a methoxy group, an ethoxy group, a phenyloxy group, a cyclohexyloxy group, and the like.

The Group 4 transition metal includes titanium, zirconium, hafnium, and the like.

Further, $R_1$ to $R_{17}$ in Chemical Formula 2 are each independently hydrogen, a methyl group, an ethyl group, a propyl group, an isopropyl group, an n-butyl group, a tert-butyl group, a pentyl group, a hexyl group, a heptyl group, an octyl group, or a phenyl group.

L in Chemical Formula 2 is more preferably a linear or branched $C_4$-$C_8$ alkylene group, but is not limited thereto. Also, the alkylene group may be substituted or unsubstituted with a $C_1$-$C_{20}$ alkyl group, a $C_2$-$C_{20}$ alkenyl group, or a $C_6$-$C_{20}$ aryl group.

A in Chemical Formula 2 is preferably hydrogen, a methyl group, an ethyl group, a propyl group, an isopropyl group, an n-butyl group, a tert-butyl group, a methoxymethyl group, a tert-butoxymethyl group, a 1-ethoxyethyl group, a 1-methyl-1-methoxyethyl group, a tetrahydropyranyl group, or a tetrahydrofuranyl group.

One example of the metallocene compound of Chemical Formula 2 according to the present invention may include a compound represented by the following Chemical Formula 2a, but is not limited thereto.

[Chemical Formula 2a]

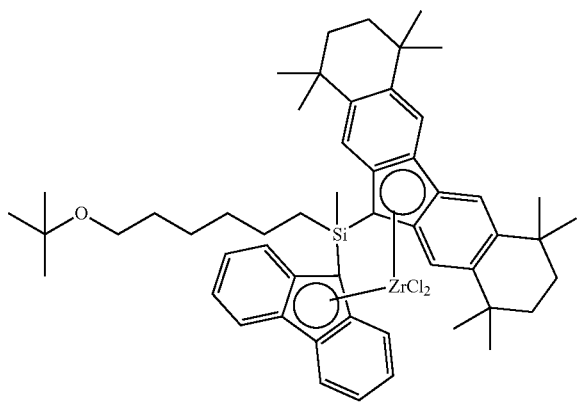

Further, in the present invention, the supported amount of the first metallocene compound and the second metallocene compound may be 0.01 mmol or more, 0.05 mmol or more, or 0.1 mmol or more, and 3 mmol or less, 1 mmol or less, or 0.5 mmol or less, based on 1 g of the support.

In the hybrid supported metallocene catalyst of the present invention, the support for supporting the first metallocene compound and the second metallocene compound may contain a hydroxy group on the surface thereof. That is, the amount of the hydroxyl group (—OH) on the surface of the support is preferably as small as possible, but it is practically difficult to remove all the hydroxyl groups. Therefore, the amount of the hydroxy group can be adjusted by the method and conditions for preparing the support or the drying conditions (temperature, time, drying method, etc.) and the like.

For example, the amount of the hydroxy group on the surface of the support is preferably 0.1 to 10 mmol/g, and more preferably 0.5 to 1 mmol/g. If the amount of the hydroxy group is less than 0.1 mmol/g, the amount of reaction sites with the cocatalyst decreases. Meanwhile, if it exceeds 10 mmol/g, it is likely to result from moisture other than the hydroxyl group present on the surface of the support, and thus, is undesirable.

At this time, in order to reduce side reactions caused by some hydroxyl groups remaining after drying, it is possible to use a support from which a hydroxy group has been chemically removed while preserving a highly reactive siloxane group participating in the supporting.

In this case, it is preferable that the support has both a hydroxyl group and a siloxane group having high reactivity on the surface. Examples of such support may include silica, silica-alumina, silica-magnesia, or the like, which are dried at a high temperature, and they may typically contain oxides, carbonates, sulfates, and nitrates, such as $Na_2O$, $K_2CO_3$, $BaSO_4$, and $Mg(NO_3)_2$.

The support is preferably used in a state of being sufficiently dried before the first and second cocatalysts and the like are supported. At this time, the drying temperature of the support is preferably 200° C. to 800° C., more preferably 300° C. to 600° C., and most preferably 400° C. to 600° C. If the drying temperature of the support is less than 200° C., it retains too much moisture so that moisture on the surface is reacted with the cocatalyst. If the drying temperature is higher than 800° C., pores on the surface of the support are combined with each other to reduce the surface area, and many hydroxyl groups are lost on the surface to leave only siloxane groups. Thus, since the amount of reactive sites with the cocatalyst is reduced, it is not preferable.

On the other hand, the hybrid supported metallocene catalyst of the present invention may include a first cocatalyst and a second cocatalyst for producing active species of the catalyst. The catalytic activity can be improved by using the two types of cocatalysts, and particularly, the molecular weight distribution of polyolefin can be controlled by using the second cocatalyst.

The first cocatalyst can be used without particular limitation as long as it is a cocatalyst used for polymerizing olefins in the presence of a general metallocene catalyst. This first cocatalyst allows the formation of bonds between the hydroxy group and the transition metal in the support. Further, since the first cocatalyst is present only on the surface of the support, it can contribute to securing the inherent characteristics of the composition of the specific hybrid catalyst of the present invention without the fouling phenomenon in which the polymer particles in the reactor agglomerate with each other and collect on the reactor wall.

In the hybrid supported metallocene catalyst, the first cocatalyst may be one or more selected from the group consisting of compounds represented by the following Chemical Formulas 3 and 4.

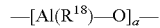  [Chemical Formula 3]

  [Chemical Formula 4]

In Chemical Formulas 3 and 4 above, each $R^{18}$ may be the same as or different from each other and each is independently a halogen or a hydrocarbyl having 1 to 20 carbon atoms substituted or unsubstituted with a halogen, a is an integer of 2 or more, each $R^{19}$ may be the same as or different from each other, and each is independently a halogen, a hydrocarbon having 1 to 20 carbon atoms, or a hydrocarbon having 1 to 20 carbon atoms substituted with a halogen, and $D^1$ is aluminum or boron.

Examples of the compounds represented by Chemical Formula 3 include methylaluminoxane, ethylaluminoxane, isobutylaluminoxane, butylaluminoxane, and the like, and a more preferred compound is methylaluminoxane.

Examples of the compounds represented by Chemical Formula 4 include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminum methoxide, dimethylaluminum ethoxide, trimethylboron, triethylboron, triisobutylboron, tripropylboron, tributylboron, and the like, and a more preferred compound is selected among trimethylaluminum, triethylaluminum, and triisobutylaluminum.

On the other hand, the second cocatalyst contained in the hybrid supported metallocene catalyst may be a borate compound represented by the following Chemical Formula 5 or 6.

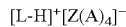  [Chemical Formula 5]

  [Chemical Formula 6]

in Chemical Formulas 5 and 6 above, each L is independently a neutral or cationic Lewis acid, each H is independently a hydrogen atom, each Z is independently a boron atom, and each A is independently an aryl or an alkyl group having 6 to 20 carbon atoms in which at least one hydrogen atom is substituted with a halogen, a hydrocarbyl group having 1 to 20 carbon atoms, an alkoxy group, a phenoxy group, a nitrogen atom, a phosphorus atom, a sulfur atom, or an oxygen atom.

The above borate-based second cocatalyst may preferably include trityl tetrakis(pentafluorophenyl)borate, N,N-dimethylanilinium tetrakis(pentafluorophenyl)borate, trimethylammonium tetrakis(pentafluorophenyl)borate, triethylammonium tetrakis(pentafluorophenyl)borate, or tripropylammonium tetrakis(pentafluorophenyl)borate. As such cocatalyst of the present invention is used in the production of polyolefin polymers suitable for producing fibers, it exhibits the specificity of the application and the specificity of the manufacturing method.

On the other hand, in the present invention, when preparing the hybrid supported metallocene catalyst, the order of supporting the components preferably includes: a step of supporting the first metallocene compound of Chemical Formula 1 and the second metallocene compound of Chemical Formula 2, respectively, before and after the step of supporting the first catalyst on the support as described above; and a step of supporting a boron-based second catalyst on the support. In accordance with this method, the hybrid supported metallocene catalyst of the present invention may include a first cocatalyst supported on a support, first and second metallocene compounds of Chemical Formulas 1 and 2, and a second cocatalyst.

Further, the supporting condition is not particularly limited, and the supporting can be carried out within a range that is well known to those skilled in the art. For example, it can be carried out by suitably using high-temperature supporting and low-temperature supporting. Specifically, when the first cocatalyst and the second cocatalyst are supported on the support, it can be carried out under a temperature condition of 25° C. to 100° C. At this time, the supporting time of the first cocatalyst and the supporting time of the second cocatalyst can be appropriately adjusted according to the amount of the cocatalyst to be supported.

Further, the reaction temperature of the first and second metallocene compounds with the support can be from −30° C. to 150° C., preferably from room temperature to 100° C., and more preferably from 30° C. to 80° C. The reacted supported catalyst can be used as it is after the reaction solvent is filtered or distilled under reduced pressure, and if necessary, it can be used after Soxhlet filtering with an aromatic hydrocarbon such as toluene.

On the other hand, the olefin monomers used in the (co)polymerization of the olefin monomers may be one or more selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, and 1-itocene.

Further, in the (co)polymerization of the olefin monomers, the supported metallocene catalyst may be injected in a form of a slurry by diluting the same with a $C_5$-$C_{12}$ aliphatic hydrocarbon solvent such as isobutane, pentane, hexane, heptane, nonane, decane, and isomers thereof, an aromatic hydrocarbon solvent such as toluene and benzene, or a hydrocarbon solvent substituted with a chlorine atom such as dichloromethane and chlorobenzene. It is preferable to use the solvent after eliminating a small quantity of water, air, and the like, which act as a catalytic poison, with a small quantity of aluminum treatment.

The polymerization of the olefin-based monomer may be carried out according to the normal method by using a reactor selected from the group consisting of a continuous slurry polymerization reactor, a loop slurry reactor, a gas phase reactor, and a liquid phase reactor solely or in combination of two or more same or different reactors while continuously providing the olefin-based monomer in a constant ratio.

During the polymerization of the olefin-based monomer, the polymerization temperature is preferably 25° C. to 500° C., more preferably 25° C. to 200° C., and still more preferably 50° C. to 150° C. Further, the polymerization pressure is preferably 1 to 100 Kgf/cm², more preferably 1 to 70 Kgf/cm², and still more preferably 5 to 50 Kgf/cm².

According to another embodiment of the present invention, a fiber including the olefin-based polymer, and having tenacity of 9.0 to 15.0 gf/denier as measured according to ASTM D638 and a stretching ratio of 7 to 15 times, is provided.

General-purpose fibers conventionally used in the art have tenacity of 4 to 6 gf/denier and a stretching ratio of just 7 to 9 times, but the fiber according to the present invention exhibits the tenacity and the stretching ratio as disclosed above, and thus it can be recognized that the present fiber has excellent high tenacity and high stretching properties.

Generally, for a fiber such as a monofilament product, a narrow molecular weight distribution is required in order to exhibit high tenacity, and the olefin-based polymer for a monofilament is prepared by using a kind of catalyst precursor for achieving the narrow molecular weight distribution. In order to achieve further enhanced high tenacity, the present invention uses the hybrid supported metallocene catalyst during the preparation of the olefin-based polymer, thereby narrowing the molecular weight distribution of the olefin-based polymer, improving the mechanical property, and enhancing the tenacity.

The fiber according to the present invention is a high tenacity and light weight product, and the fiber is characterized in that the production cost and the product weight can be reduced, because the amount of resin spent for preparing a fiber having the same tenacity can be reduced.

In addition, the fiber of the present invention may have a tensile strength half-life of 230 to 320 h when measuring a phenomenon where tensile strength decreases under a condition of degradation being accelerated with a xenon-arc lamp according to AATCC Test Method #16. That is, in the case of the tensile strength half-life of the fiber according to the present invention, it shows the values measured by confirming a phenomenon where tensile strength decreases by exposure to ultraviolet rays according to AATCC Test Method #16 used for a discoloration test. In addition, the present invention shows the result of the test which is performed by accelerating with a xenon-arc lamp under more severe conditions.

Here, the longer the tensile strength half-life, the more the durability of the fiber is improved, and thus the present invention can provide a fiber having excellent durability because it exhibits a longer half-life than the conventional one.

In addition, the present invention provides a method for producing a fiber using a resin composition containing the polyolefin polymer including an extruding process by an extruder.

In the method for producing fibers according to the present invention, the resin composition containing the olefin polymer may include other additives. Specific examples of such additives include a heat stabilizer, an antioxidant, a UV absorber, a light stabilizer, a metal deactivator, a filler, a reinforcing agent, a plasticizer, a lubricant, an emulsifier, a pigment, an optical bleaching agent, a flame retardant, an antistatic agent, a foaming agent, and the like. The kinds of the additives are not particularly limited, and general additives known in the art can be used.

In addition, the present invention can provide a product including the fiber. Specific examples of the product including the fiber are products which can be prepared by using the high tenacity fiber, and may include monofilament products such as a rope, a fishing net, a safety net, a sports net, and the like, and tarpaulin products such as a cover, a gunny bag, a hose, a tent, and the like.

Hereinafter, the operation and effect of the present invention will be described in more detail through specific examples. However, these examples are for illustrative purposes only and are not intended to limit the scope of the invention.

EXAMPLES

Organic reagents and solvents used in the following examples were purchased from Aldrich and purified in a standard manner, unless stated otherwise. At all stages of the synthesis, the contact between air and water was blocked to improve the reproducibility of the experiment.

Examples 1 to 7

1) Preparation of Hybrid Supported Metallocene Catalyst

By using the metallocene compound of Chemical Formula 1a and the metallocene compound of Chemical Formula 2a, silica (SP952X_1836 produced by Grace Davison, calcinated at 600° C.) as a support, methylaluminoxane as a first catalyst, and N,N-dimethylanilinium tetrakis(pentafluorophenyl)borate as a second catalyst, a hybrid supported metallocene catalyst was prepared. The content ratio of each component used is as shown in Table 1 below.

Specifically, 100 ml of a toluene solution was added to a glass reactor and 10 g of the prepared silica was added thereto, followed by stirring while raising the temperature of the reactor to 60° C. After the silica was thoroughly dispersed, the metallocene catalyst of Chemical Formula 1a was added and stirred for 2 h. After stopping the stirring, 53.1 ml of a methylaluminoxane (MAO)/toluene solution was added thereto, and stirred at 200 rpm at a temperature of 80° C. for 16 h. Thereafter, the temperature was lowered to 40° C. and the mixture was washed with a sufficient amount of toluene to remove unreacted aluminum compound.

Subsequently, 100 ml of toluene was charged and the metallocene catalyst of Chemical Formula 2a was added thereto, followed by stirring for 2 h. At this time, the metallocene catalysts of Chemical Formulas 1a and 2a were respectively dissolved in 20 ml of toluene in advance and then added in a solution state.

Next, N,N-dimethylanilinium tetrakis(pentafluorophenyl)borate was dissolved in 50 ml of toluene at the molar ratio shown in Table 1 below, and then added to the reactor containing the supported catalyst (silica supported by methylaluminoxane and two kinds of metallocene catalysts). In addition, about 50 ml of toluene was added to the reactor to adjust the total amount of the solution to about 150 ml, followed by stirring at 200 rpm at a temperature of 80° C. for 1 h. Subsequently, the catalyst was allowed to settle and the toluene layer was separated and removed, and the residual toluene was removed by reducing the pressure at 40° C.

Then, the mixed solution was reacted by further stirring for about 2 h. After completion of the reaction, the stirring was stopped, the toluene layer was separated and removed, and the residual toluene was removed under reduced pressure at 40° C. to prepare a hybrid supported metallocene catalyst.

2) Preparation of Polyethylene Homopolymer

Ethylene was polymerized in the presence of the prepared hybrid supported metallocene catalyst to prepare polyethylene.

20 mg of each of the hybrid supported metallocene catalysts was quantified in a dry box and placed in a 50 ml glass bottle, and then sealed with a rubber diaphragm, and removed from the dry box to prepare a catalyst to be injected. The olefin polymerization was carried out in one 2 l metal alloy reactor equipped with a mechanical stirrer having a temperature control device and used at high pressure.

Specifically, each of the supported metallocene catalysts was fed into a single loop slurry polymerization step, and high density polyethylene was produced according to the normal method. In addition, homopolymerization was carried out without using a comonomer.

Here, 750 ppm of a primary antioxidant (Irganox 1010, CIBA Co., Ltd.), 1500 ppm of a secondary antioxidant (Irgafos 168, CIBA Co., Ltd.) and 3000 ppm of a processing aid (SC 110, Ca-St, Doobon Yuwha Co., Ltd.) were added to the resulting polyethylene polymer, which was pelletized at an extrusion temperature of 170 to 220° C. by using a twin-screw extruder (W&P Twin Screw Extruder, 75 pi, L/D=36). The extrusion test for the processability of the resin was carried out under the condition of 240° C. to 280° C. (Temp. Profile (° C.): 240/260/270/280) by using a Haake Single Screw Extruder (19 pi, L/D=25). In addition, it was extruded into filaments with the extruding temperature of 240° C. to 280° C. (Temp. profile (° C.): 240/260/270/280) by using a single extruder (EM Korea Co. Ltd., Monofilament M/C, 90 pi, L/D=30) to meet the standard of 800 denier. The base material properties and the product properties of the polyethylene polymer were evaluated based on the following evaluation method, and the results are shown in Table 1 below.

<Base Material Properties>
1) Density: ASTM D 1505
2) Melt Index (MI, 2.16 kg/10 min): Measuring temperature 190° C., ASTM D1238
3) Molecular Weight and Molecular Weight Distribution: measuring temperature 160° C.; number average molecular weight, weight average molecular weight, and Z average molecular weight measured using gel permeation chromatography (GPC); molecular weight distribution represented by the ratio between weight average molecular weight and number average molecular weight.

Comparative Example 1

Polyethylene was prepared in the same manner as in Example 1, except that the second cocatalyst was not used.

Also, the physical properties of the polyethylene were evaluated by the method of Example 1, and the results are shown in Table 1 below.

TABLE 1

| | Recipe | | | | | | |
|---|---|---|---|---|---|---|---|
| | Co-catalyst 1 | Met1 | Met2 | Co-catalyst 2 | Activity | GPC | |
| | Mmol/g-SiO$_2$ | | | | Kg-PE/g-SiO$_2$ | Mw (×10$^3$) | PDI |
| Example 1 | 8 | 0.1 | 0.05 | 0.4 | 39.8 | 186 | 2.5 |
| Example 2 | 8 | 0.1 | 0.05 | 0.3 | 35.9 | 188 | 2.6 |
| Example 3 | 8 | 0.1 | 0.05 | 0.2 | 28.0 | 190 | 2.7 |
| Example 4 | 8 | 0.1 | 0.05 | 0.17 | 28.0 | 192 | 2.7 |
| Example 5 | 8 | 0.1 | 0.05 | 0.15 | 23.4 | 190 | 2.8 |
| Example 6 | 8 | 0.1 | 0.05 | 0.13 | 20.5 | 193 | 2.9 |
| Example 7 | 8 | 0.1 | 0.05 | 0.07 | 12.0 | 195 | 3.0 |
| Example 8 | 8 | 0.1 | 0.05 | 0.45 | 39.0 | 185 | 2.5 |
| Comparative Example 1 | 8 | 0.1 | 0.05 | 0 | 4.2 | 410 | 3 |

Note)
In Table 1 above, Met1 is the first metallocene compound and Met2 is the second metallocene compound.

Referring to Table 1 above, according to the present invention, by using a borate-based compound as the second cocatalyst and a hybrid supported metallocene catalyst with controlled content during (co)polymerization of an olefin, it was possible to prepare a polyolefin polymer satisfying all the physical properties such as high catalytic activity, a medium molecular weight range, and a narrow molecular weight distribution, as compared with a conventional one.

Experimental Example

A fiber (resin) was prepared in accordance with a conventional method by using the polyethylenes of Examples 1 to 7 and Comparative Example 1, its physical properties and processability were evaluated by the following method, and the results are shown in Table 2 below.
<Various Product Properties>
1) Tensile strength half-life: After measuring tensile strength based on ASTM D638, a tensile strength half-life was measured by the following method.

The tensile strength half-life was measured by confirming a phenomenon where tensile strength decreases by exposure to ultraviolet rays according to AATCC method #16 used for a discoloration test. The test was carried out by accelerating with a xenon-arc lamp, and the results are shown in Table 2 below.

2) Stretching ratio (times): There is a stretching process for increasing the tenacity when processing a fiber (filament or yarn). At this time, the ratio of stretching the fiber is referred to as a stretching ratio. The stretching ratio was measured by a ratio (RPM$_2$/RPM$_1$) between a rotational speed of a take-off roll (RPM$_2$) and a rotational speed of a supply roll (PRM$_1$).

3) Tenacity (g/denier): Tenacity means the strength at break of a fiber, and it was measured according to the ASTM D638 standard. The testing speed was 200 mm/min, and every specimen was measured six times and their average was taken. For reference, denier is an international unit which is used for representing the thickness of a fiber, and 1 denier is what has a unit weight of 1 g per the standard length of 9000 m.

TABLE 2

| Classification | Physical properties of fiber product | | |
|---|---|---|---|
| Physical property item | Stretching ratio (times) | Tenacity (Gf/denier) | Tensile strength half-life (h) |
| Example 1 | 15 | 15 | 308 |
| Example 2 | 15 | 15 | 306 |
| Example 3 | 14 | 14 | 297 |
| Example 4 | 14 | 13 | 296 |
| Example 5 | 14 | 13 | 295 |
| Example 6 | 13 | 12 | 289 |
| Example 7 | 10 | 9 | 264 |
| Example 8 | 15 | 15 | 307 |
| Comparative Example 1 | 8 | 7 | 245 |

As seen in Table 2 above, it was confirmed that the examples used a polyethylene polymer having a narrow molecular weight distribution and a high weight average molecular weight, and thus could prepare a fiber product having higher stretching ratio, tenacity, and tensile strength half-life than the comparative example.

However, in Comparative Example 1, a polyethylene polymer was prepared by using a hybrid supported catalyst not containing a borate-based cocatalyst, and therefore the stretching ratio and tenacity of the fiber product were low, the tensile strength half-life was low, and the high tenacity fiber could not be prepared.

The invention claimed is:

1. A method for preparing a polyolefin polymer for fiber production comprising polymerizing one or more olefin monomers in the presence of a hybrid supported metallocene catalyst,
wherein the hybrid supported metallocene catalyst includes a first cocatalyst supported on a support, first and second metallocene compounds represented by the following Chemical Formulas 1 and 2, and a second cocatalyst, and is prepared by a method comprising:
supporting a first metallocene compound of the following Chemical Formula 1 and a second metallocene compound of the following Chemical Formula 2, respectively, before and after a step of supporting the first cocatalyst on the support; and
supporting a borate-based second catalyst on the support:

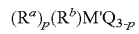  [Chemical Formula 1]

wherein, in Chemical Formula 1 above,
P is an integer of 0 or 1,
M' is a Group 4 transition metal,
$R^a$ and $R^b$ are the same as or different from each other and are each independently a cyclopentadienyl ligand substituted with one or more selected from the group consisting of hydrogen, an alkyl having 1 to 20 carbon atoms, an alkoxyalkyl having 2 to 20 carbon atoms, a cycloalkyl having 3 to 20 carbon atoms, an aryl having 6 to 40 carbon atoms, an alkenyl having 2 to 20 carbon atoms, an alkylaryl having 7 to 40 carbon atoms, an arylalkyl having 7 to 40 carbon atoms, and an arylalkenyl having 8 to 40 carbon atoms, and
Q is a halogen,

[Chemical Formula 2]

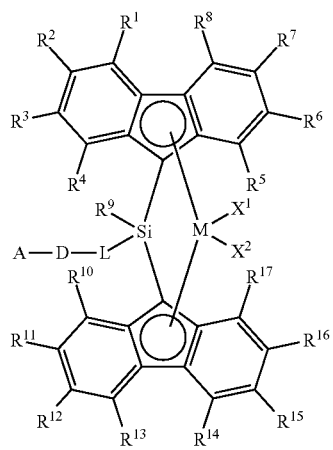

wherein, in Chemical Formula 2 above,
$R^1$ to $R^{17}$ are the same as or different from each other and are each independently hydrogen, a halogen, an alkyl group having 1 to 20 carbon atoms, an alkenyl group having 2 to 20 carbon atoms, a cycloalkyl group having 2 to 20 carbon atoms, an aryl group having 6 to 20 carbon atoms, an alkylaryl group having 7 to 20 carbon atoms, or an arylalkyl group having 7 to 20 carbon atoms; or $R^1$ to $R^{17}$ are bonded to each other to form a cycloalkyl ring group having 2 to 20 carbon atoms, an aryl ring having 6 to 20 carbon atoms, an alkylaryl ring having 7 to 20 carbon atoms, or an arylalkyl ring having 7 to 20 carbon atoms; and at least one of $R^1$ to $R^{17}$ is a substituent other than hydrogen and a halogen among the above substituents,
L is a linear or branched alkylene group having 1 to 10 carbon atoms,
D is —O—, —S—, —N($R^{18}$)—, or —Si($R^{19}$)($R^{20}$)— wherein $R^{18}$ to $R^{20}$ are the same as or different from each other and are each independently hydrogen, a halogen, an alkyl group having 1 to 20 carbon atoms, an alkenyl group having 2 to 20 carbon atoms, or an aryl group having 6 to 20 carbon atoms,
A is hydrogen, a halogen, an alkyl group having 1 to 20 carbon atoms, an alkenyl group having 2 to 20 carbon atoms, an aryl group having 6 to 20 carbon atoms, an alkylaryl group having 7 to 20 carbon atoms, an arylalkyl group having 7 to 20 carbon atoms, an alkoxy group having 1 to 20 carbon atoms, an alkoxyalkyl group having 2 to 20 carbon atoms, a heterocycloalkyl group having 2 to 20 carbon atoms, or a heteroaryl group having 5 to 20 carbon atoms,
M is a Group 4 transition metal, and
$X^1$ and $X^2$ are the same as or different from each other and are each independently a halogen, an alkyl group having 1 to 20 carbon atoms, an alkenyl group having 2 to 20 carbon atoms, an aryl group having 6 to 20 carbon atoms, a nitro group, an amido group, an alkylsilyl group having 1 to 20 carbon atoms, an alkoxy group having 1 to 20 carbon atoms, or a sulfonate group having 1 to 20 carbon atoms.

2. The method for preparing a polyolefin polymer for fiber production according to claim 1, wherein the second cocatalyst is a borate-based cocatalyst, and a ratio between the total metal moles contained in the metallocene catalyst in which the first metallocene compound and the second metallocene compound are combined and the moles of boron contained in the second cocatalyst is from 1:0.45 to 1:3.

3. The method for preparing a polyolefin polymer for fiber production according to claim 1, wherein the first cocatalyst is one or more selected from the group consisting of compounds represented by the following Chemical Formulas 3 and 4:

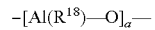   [Chemical Formula 3]

   [Chemical Formula 4]

wherein, in Chemical Formulas 3 and 4 above,
each $R^{18}$ is the same as or different from each other, and each is independently a halogen or a hydrocarbyl having 1 to 20 carbon atoms substituted or unsubstituted with a halogen,
a is an integer of 2 or more,
each $R^{19}$ is the same as or different from each other, and each is independently a halogen, a hydrocarbon having 1 to 20 carbon atoms, or a hydrocarbon having 1 to 20 carbon atoms substituted with a halogen, and
$D^1$ is aluminum or boron.

4. The method for preparing a polyolefin polymer for fiber production according to claim 1, wherein the second cocatalyst is a borate compound represented by the following Chemical Formula 5 or 6:

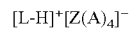   [Chemical Formula 5]

   [Chemical Formula 6]

wherein, in Chemical Formulas 5 and 6 above, each L is independently a neutral or cationic Lewis acid, each H is independently a hydrogen atom, each Z is independently a boron atom, and each A is independently an aryl or an alkyl group having 6 to 20 carbon atoms in which at least one hydrogen atom is substituted with a halogen, a hydrocarbyl group having 1 to 20 carbon atoms, an alkoxy group, a phenoxy group, a nitrogen atom, a phosphorus atom, a sulfur atom, or an oxygen atom.

5. The method for preparing a polyolefin polymer for fiber production according to claim 4, wherein the second cocatalyst includes trityl tetrakis(pentafluorophenyl)borate, N,N-dimethylanilinium tetrakis(pentafluorophenyl)borate, trimethylammonium tetrakis(pentafluorophenyl)borate, triethylammonium tetrakis(pentafluorophenyl)borate, or tripropylammonium tetrakis(pentafluorophenyl)borate.

6. The method for preparing a polyolefin polymer for fiber production according to claim 1, wherein the support contains a hydroxyl group and a siloxane group on its surface.

7. The method for preparing a polyolefin polymer for fiber production according to claim 1, wherein the support contains one or more selected from silica, silica-alumina, and silica-magnesia.

8. The method for preparing a polyolefin polymer for fiber production according to claim 1, wherein the olefin monomer is one or more selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, and 1-itocene.

9. The method for preparing a polyolefin polymer for fiber production according to claim 1, wherein the polyolefin polymer has a weight average molecular weight of 100,000 to 300,000 and a PDI of 2.0 to 3.2.

10. The method for preparing a polyolefin polymer for fiber production according to claim 1, wherein the polyolefin polymer has tenacity of 9.0 to 15.0 (gf/denier) as measured according to ASTM D638 and a stretching ratio of 7 to 15 times.

11. The method for preparing a polyolefin polymer according to claim 1, wherein the polyolefin polymer has a melt index (MI; 190° C., 2.16 kg) of 0.1 to 2.0 g/10 min and a density of 0.945 to 0.955 g/cm$^3$.

12. The method for preparing a polyolefin polymer according to claim 1, wherein the polyolefin polymer has a melt index of 0.3 to 1.5 g/10 min and a density of 0.945 to 0.955 g/cm$^3$.

\* \* \* \* \*